US012633802B2

(12) United States Patent
Choi et al.

(10) Patent No.: US 12,633,802 B2
(45) Date of Patent: May 19, 2026

(54) COOLING WATER CONTROL UNIT

(71) Applicant: HANON SYSTEMS EFP KOREA INC., Asan-si (KR)

(72) Inventors: Sung Hwan Choi, Asan-si (KR); Oh Sang Shin, Asan-si (KR); Jeong Min Shim, Asan-si (KR); Gwang Yeol Byeon, Asan-si (KR)

(73) Assignee: HANON SYSTEMS EFP KOREA INC. (KR)

( * ) Notice: Subject to any disclaimer, the term of this patent is extended or adjusted under 35 U.S.C. 154(b) by 218 days.

(21) Appl. No.: 18/569,445

(22) PCT Filed: Sep. 27, 2022

(86) PCT No.: PCT/KR2022/014476
§ 371 (c)(1),
(2) Date: Dec. 12, 2023

(87) PCT Pub. No.: WO2023/080448
PCT Pub. Date: May 11, 2023

(65) Prior Publication Data
US 2024/0213853 A1    Jun. 27, 2024

(30) Foreign Application Priority Data

Nov. 3, 2021    (KR) ........................ 10-2021-0150023

(51) Int. Cl.
H02K 9/19 (2006.01)
H02K 9/193 (2006.01)
(52) U.S. Cl.
CPC ................................... H02K 9/193 (2013.01)

(58) Field of Classification Search
CPC ............ H02K 9/193; Y02E 60/10; F01P 5/10; F01P 7/14; F01P 11/02; F01P 11/029; F01P 2005/105; F01P 2007/146; F01P 2050/22
See application file for complete search history.

(56) References Cited

U.S. PATENT DOCUMENTS

2004/0237912 A1    12/2004    Pawellek et al.

FOREIGN PATENT DOCUMENTS

| | | | | | |
|---|---|---|---|---|---|
| CN | 104005831 | A | * | 8/2014 | |
| CN | 212979863 | U | | 4/2021 | |
| JP | 2005009333 | A | | 1/2005 | |
| JP | 2015119016 | A | | 6/2015 | |
| JP | 2019520261 | A | | 7/2019 | |
| KR | 101567434 | B1 | * | 11/2015 | ............... F01P 7/14 |
| KR | 101720568 | B1 | * | 3/2017 | ............. F01P 7/167 |
| KR | 20190007220 | A | | 1/2019 | |
| KR | 20210091897 | A | | 7/2021 | |
| KR | 20210109188 | A | | 9/2021 | |
| KR | 1020210109188 | A | | 9/2021 | |
| KR | 20220021875 | A | * | 2/2022 | ............... F01P 7/14 |
| KR | 102543593 | B1 | * | 6/2023 | ............. B60H 1/323 |
| WO | WO-2014148126 | A1 | * | 9/2014 | ......... F16K 11/0876 |

* cited by examiner

*Primary Examiner* — Hung Q Nguyen
(74) *Attorney, Agent, or Firm* — Shumaker, Loop & Kendrick, LLP; James D. Miller

(57) ABSTRACT

A coolant control unit is configured to implement a stable operation of a control unit by means of heat exchange between high-temperature thermal energy generated by the control unit and low-temperature thermal energy of a coolant. The coolant control unit includes a valve unit rotatably installed in the housing unit and configured to change a transmission direction of a coolant.

13 Claims, 15 Drawing Sheets

COOLING WATER CONTROL UNIT

CROSS REFERENCE TO RELATED PATENT APPLICATIONS

This is a U.S. national phase patent application of PCT/KR2022/014476 filed Sep. 27, 2022 which claims the benefit of and priority to Korean Patent Application No. 10-2021-0150023, filed on Nov. 3, 2021, the entire contents of each of which are incorporated herein by reference.

TECHNICAL FIELD

The present embodiment relates to a coolant control unit capable of efficiently supplying and cooling a coolant to be supplied to various types of cooling or heating units and an electric power system provided in an environmental-friendly vehicle.

BACKGROUND ART

In general, environmental-friendly vehicles such as electric vehicles have come into wide use to solve environmental issues caused by internal combustion engine vehicles. However, in the case of an internal combustion engine vehicle in the related art, a separate heating process may be conveniently performed because waste heat of an engine may be used to heat the interior of the vehicle.

Recently, various environmental-friendly vehicles have been introduced because the environmental-friendly vehicles are more environmentally friendly than internal combustion engine vehicles. For example, electric vehicles (EVs) are being actively researched as the most promising alternative to cope with future vehicle pollution and energy issues.

The electric vehicles are classified into a fuel cell type vehicle configured to be operated by electricity generated by chemical change, and a secondary battery type or battery type vehicle configured to obtain power by operating an AC or DC motor using power of a battery. The electric vehicles include vehicles configured to obtain power by supplying electric power in a different way from the above-mentioned vehicles.

A large amount of heat is generated when electricity is supplied to a driving part of the electric vehicle. In addition, the electric vehicle has a problem in that resistance is also increased because of the generation of heat, which accelerates electric discharge, degrades charging efficiency or discharging efficiency, and shortens a lifespan. Therefore, a coolant circulation circuit is installed to appropriately eliminate the heat.

Further, similar to the internal combustion engine vehicle in the related art, the electric vehicle is equipped therein with a refrigerant circulation circuit for cooling and heating an interior space, and an air circulation circuit for ventilating the interior.

As described above, the electric vehicle is equipped with various types of valve devices capable of distributing, controlling, and regulating flows of fluids in the air circulation circuit and the refrigerant circulation circuit as well as the coolant circulation circuit of the battery.

Meanwhile, as the vehicle is motorized, there is an additional need to manage not only heat in the interior of the vehicle, but also heat of electrical components such as a high-voltage battery and a motor. That is, in the case of the electric vehicle, the interior space, the battery, and the electrical components have different needs for air conditioning, and thus there is required a technology capable of maximally saving energy by independently coping with and efficiently and cooperatively managing the different needs.

The cooling system for electrical components mainly cools an electrical component, an actuator, an HSG (hybrid start and generator), and the like by using a coolant. The electrical component is structured to heat the battery in cold weather by allowing the coolant to bypass a radiator through a bypass circuit and allowing waste heat of a PE component (power electronics) to pass through the battery.

In this case, the components for controlling a flow of the coolant in the electrical component cooling system of the environmental-friendly vehicle need to satisfy various uses such as heating, cooling, and waste heat recovery from a plurality of components.

For example, a coolant valve and a coolant pump provided in the environmental-friendly vehicle in the related art will be described.

With reference to FIG. 1 attached hereto, a coolant valve 10 and coolant pumps 20 and 30 in the related art are provided at different positions adjacent to electrical components, mounted independently in a vehicle, and spaced apart from one another. The constituent elements spaced apart from one another are connected by means of hoses extending by predetermined lengths.

For example, a controller 40 is independently provided at a separate position to control an operation of the coolant valve 10 and operations of the coolant pumps 20 and 30. The controller 40 is connected to the coolant valve 10 and the coolant pumps 20 and 30 and also connected to a vehicle 30 by means of wiring 60.

The coolant valve 10 and the coolant pumps 20 and 30 in the related art do not have a separate cooling circuit using a flowing coolant but need to dissipate heat only by using a coolant flowing to the coolant pumps 20 and 30. For this reason, there is a limitation in developing a high-power coolant pump. In addition, the coolant valve cannot operate under a high-temperature condition, which causes a problem in that an allowable operating current decreases.

In addition, the wiring 60 is necessarily required to connect the coolant valve 10 and the coolant pumps 20 and 30, which causes a problem in that the number of assembling processes and the manufacturing costs are increased and the ease of mounting the components is degraded.

SUMMARY

The present embodiments are intended to provide a coolant control unit capable of integrally supplying a coolant to various electrical components provided in an environmental-friendly vehicle and stably eliminating high-temperature heat, which is generated when the coolant control unit operates, by using the coolant.

The present embodiment relates to a coolant control unit capable of efficiently supplying and cooling a coolant to be supplied to various types of cooling or heating units and an electric power system provided in an environmental-friendly vehicle.

A coolant control unit according to the present embodiment includes: a housing unit (100) configured to define an overall external shape; a valve unit (200) rotatably installed in the housing unit (100) and configured to change a transmission direction of a coolant; a coolant pump unit (300) coupled to the housing unit (100); a drive motor unit (400) configured to operate the valve unit (200); a control unit (500) configured to control operations of the valve unit (200), the coolant pump unit (300), and drive motor unit (400); and a controller housing (600) configured to accommodate the control unit (500) and having a coolant inlet part (610) through which the coolant is introduced, the controller housing being configured such that the control unit (500) is cooled as thermal energy generated by the control unit (500) exchanges heat, by means of heat transfer, with the coolant introduced through the coolant inlet part (610).

The housing unit (100) may further include: a coolant reservoir (110) configured to store the coolant to be supplied to the housing unit (100); and a coolant outlet part (120) configured to discharge the coolant transmitted through the coolant inlet part (610) or the coolant reservoir (110).

The controller housing (600) and the housing unit (100) may be made of different materials.

The controller housing (600) may be made of a material having a high heat transfer rate.

The controller housing (600) may have a controller accommodation portion (602) configured to accommodate the control unit (500), and a heat transfer layer (604) may be provided between the control unit (500) and the controller accommodation portion (602) so that the thermal energy generated by the control unit (500) is transferred to the controller accommodation portion (602).

The coolant control unit may further include: a heat transfer induction part (606) provided on the controller accommodation portion (602) and configured to provide directionality when the thermal energy generated by the control unit (500) is transferred along an extension route of the coolant inlet part (610).

The heat transfer induction part (606) may be formed in a thin plate shape and extend by a predetermined length in a direction in which the coolant inlet part (610) is introduced.

The heat transfer induction part (606) may include: a first heat transfer induction portion (606a) formed to have a predetermined length and provided on an inner bottom surface of the controller accommodation portion (602); and a second heat transfer induction portion (606b) extending from an extension end of the first heat transfer induction portion (606a) along an inner edge of the controller accommodation portion (602).

The heat transfer induction part (606) may be formed in any one of an embossed shape and a debossed shape in the controller accommodation portion (602).

The coolant pump unit (300) may include: a first coolant pump (310) configured to supply the coolant to an electric power system unit provided in an environmental-friendly vehicle; and a second coolant pump (320) configured to supply the coolant to a battery unit provided in the environmental-friendly vehicle or an electrical component related to a battery.

The coolant inlet part (610) may include: a first coolant inlet portion (612) configured to simultaneously supply a low-temperature coolant to the first coolant pump (310) and transfer the thermal energy generated by the control unit (500); and a second coolant inlet portion (614) configured to simultaneously supply a low-temperature coolant to the second coolant pump (320) and transfer the thermal energy generated by the control unit (500).

A partition wall (113) may be provided in the coolant reservoir (110) to independently divide an internal space of the coolant reservoir and store the coolant.

The coolant control unit may further include: a housing cover (700) coupled to the controller housing (600) and configured to accommodate the drive motor unit (400) therein.

According to the embodiments of the present disclosure, the coolant, which is supplied to the electric power system electrical component or the battery electrical component mounted in the environmentally-friendly vehicle, may be managed in an integrated manner, and the control unit may be stably cooled by air-cooled heat dissipation by means of heat exchange between the controller housing and the outside air and heat exchange using thermal conduction between the coolant and the high-temperature thermal energy generated by the control unit.

According to the present embodiments, the coolant control unit, in which the pump unit, the drive motor unit, the valve unit, and the control unit are integrated, is configured to be conveniently manufactured, thereby improving workability of the operator and reducing manufacturing costs.

According to the present embodiments, it is possible to provide the coolant control unit that dissipates the thermal energy, which is generated by the control unit, by means of heat transfer between the controller housing and the flow of the coolant, such that the coolant control unit may be stably operated regardless of various changes in temperatures and usage locations.

DESCRIPTION OF AN EMBODIMENT

Figure 1:
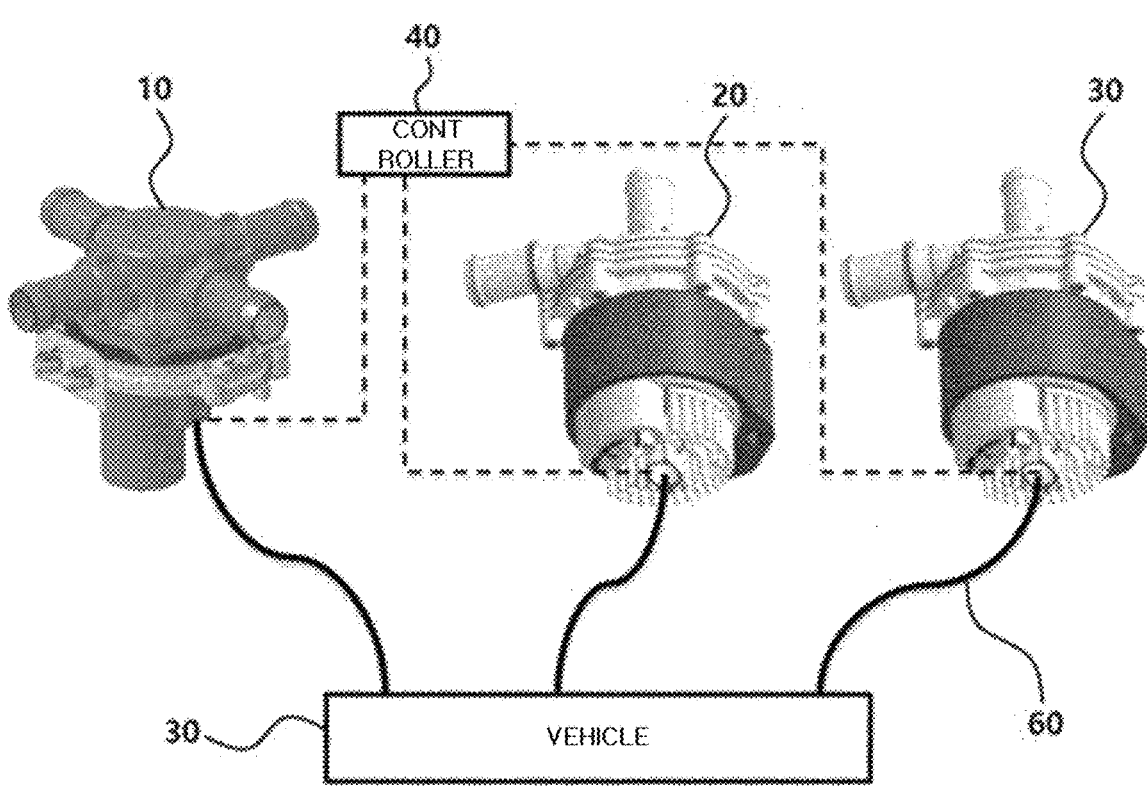
FIG. 1 is a view illustrating a coolant valve and a coolant pump provided in an environmental-friendly vehicle in the related art.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art to which the present disclosure pertains can fully understand the scope of the present disclosure. The present disclosure will be defined only by the scope of the appended claims. Throughout the specification, the same reference numerals denote the same constituent elements.

A configuration in which one constituent element is "connected to" or "coupled to" another constituent element includes both a configuration in which one constituent element is connected or coupled directly to another constituent element and a configuration in which another constituent element is interposed therebetween. In contrast, when one constituent element is "connected directly to" or "coupled directly to" another constituent element, there are no constituent elements interposed therebetween. The term "and/or" includes each and all combinations of one or more of the mentioned items.

The terms used in the present specification are for explaining the exemplary embodiments, not for limiting the present disclosure. Unless particularly stated otherwise in the present specification, a singular form also includes a plural form. The terms "comprise (include)" and/or "comprising (including)" used in the specification are intended to specify the presence of the mentioned constituent elements, steps, operations, and/or elements, but do not exclude the presence or addition of one or more other constituent elements, steps, operations, and/or elements.

The terms "first", "second", and the like may be used to describe various components, but the components are of course not limited by these terms. These terms are merely used to distinguish one component from another component.

Figure 2:
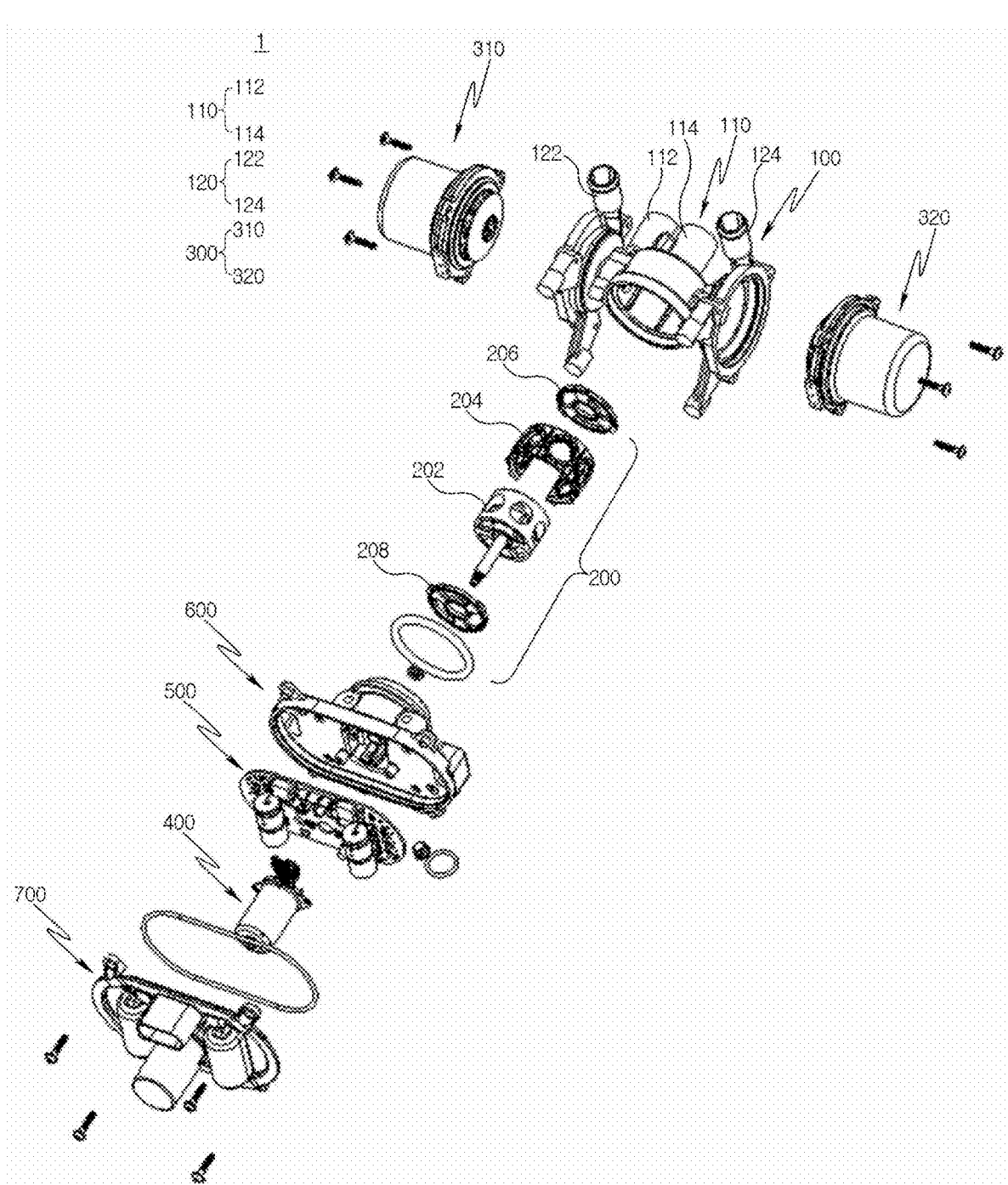
FIG. 2 is an exploded perspective view of a coolant control unit according to the present embodiment.
Figure 3:
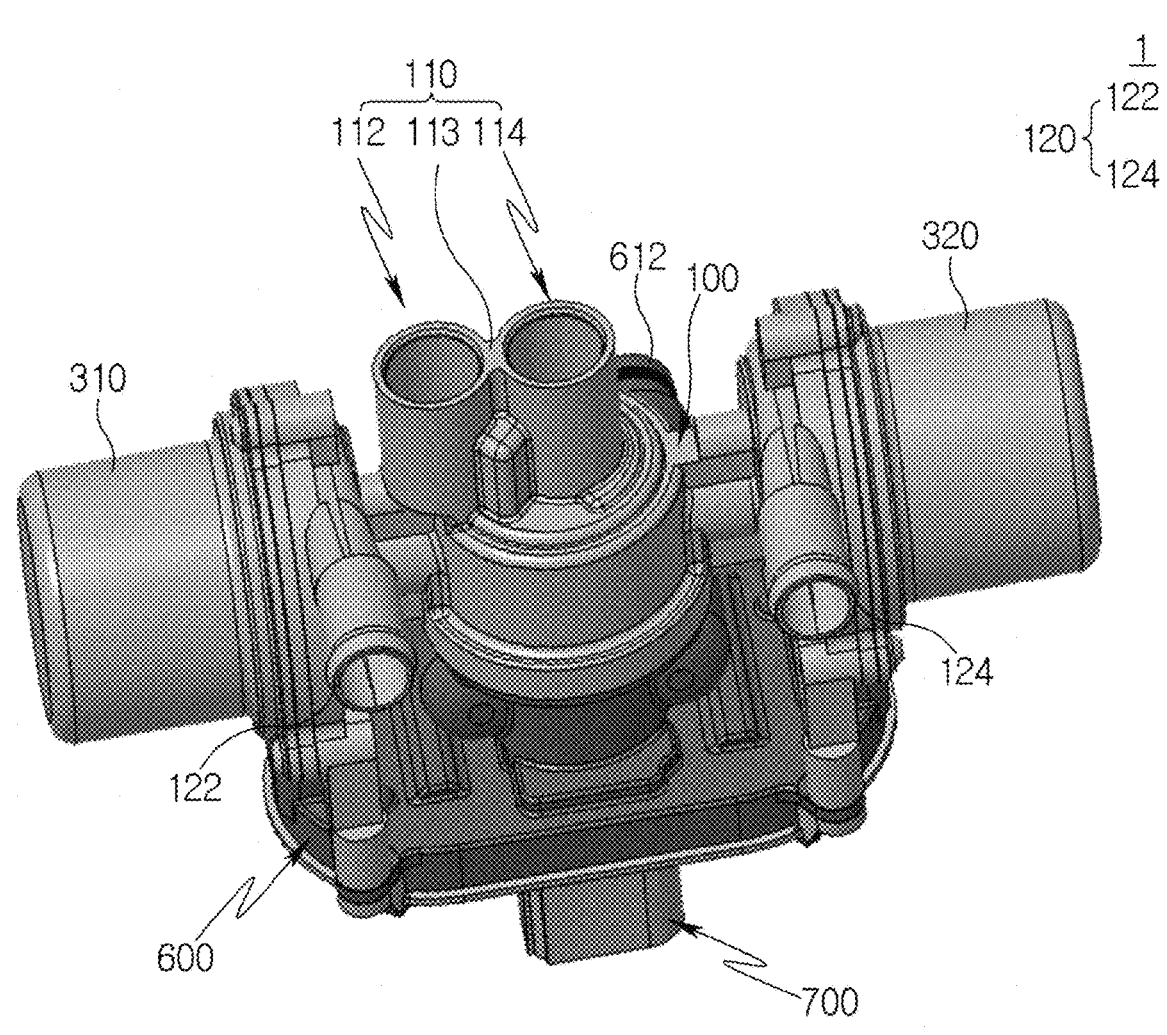
FIGS. 3 to 4 are coupled perspective views illustrating the coolant control unit according to the present embodiment when viewed at various angles.
Figure 4:
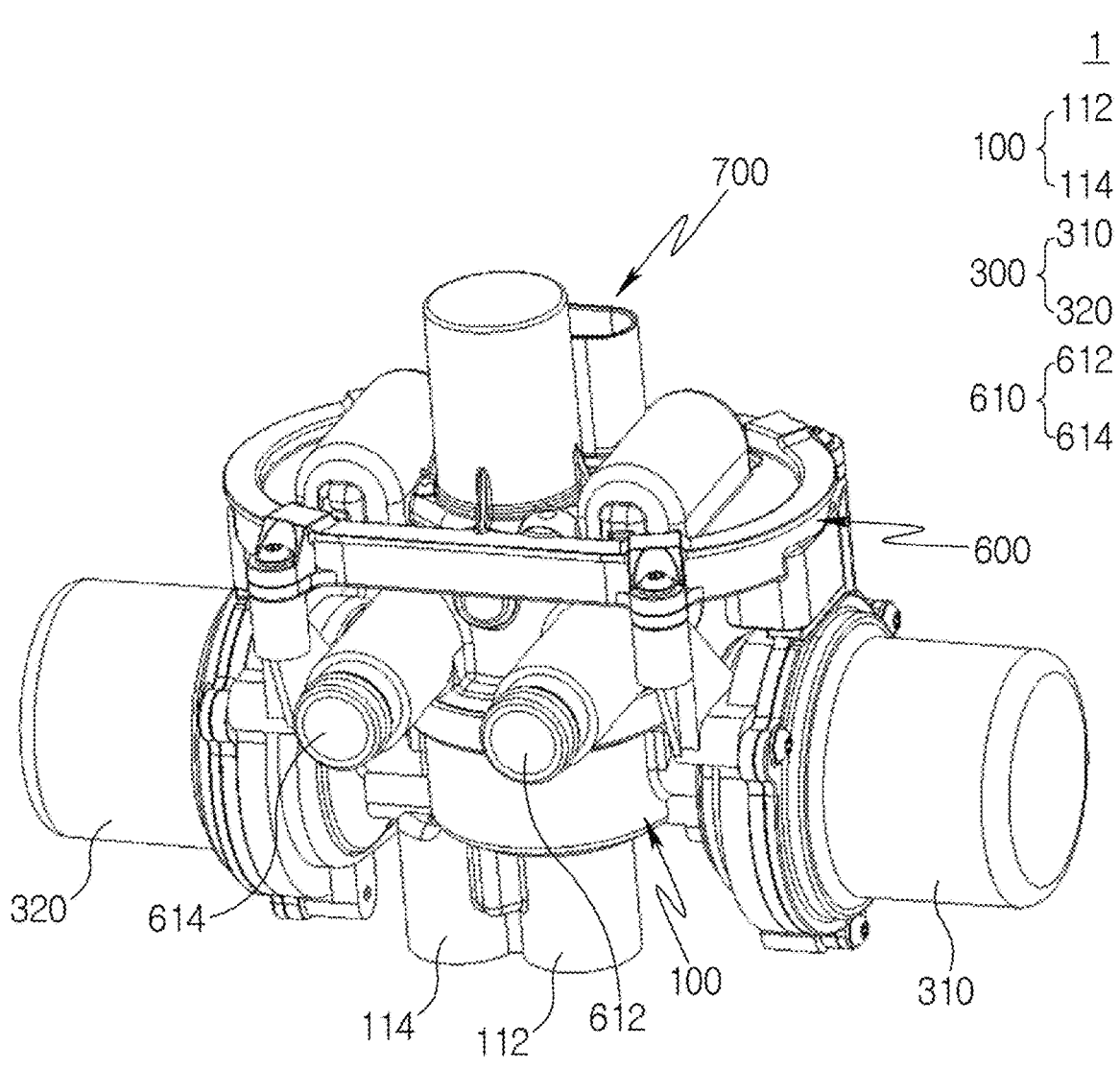
Figure 5:
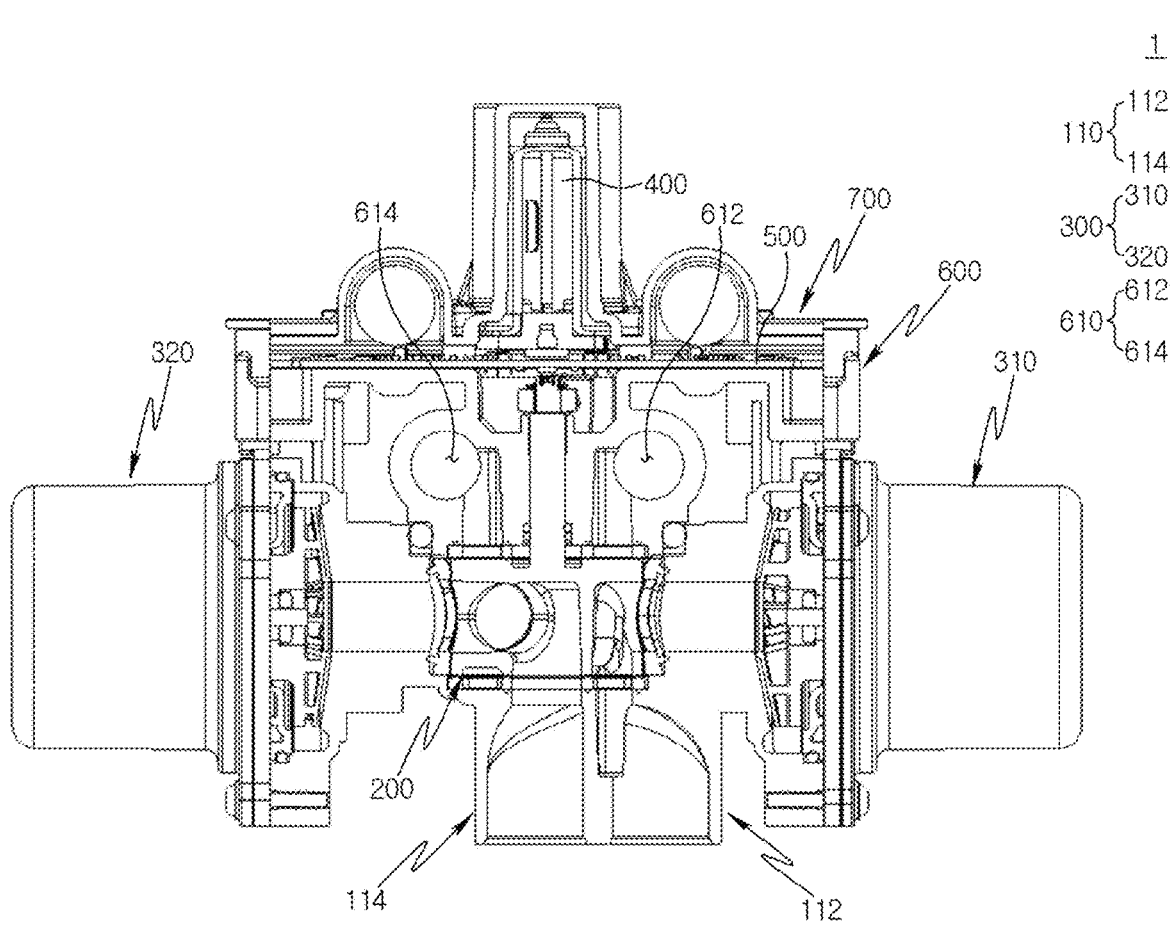
FIG. 5 is a longitudinal cross-sectional view of FIG. 4.
Figure 6:
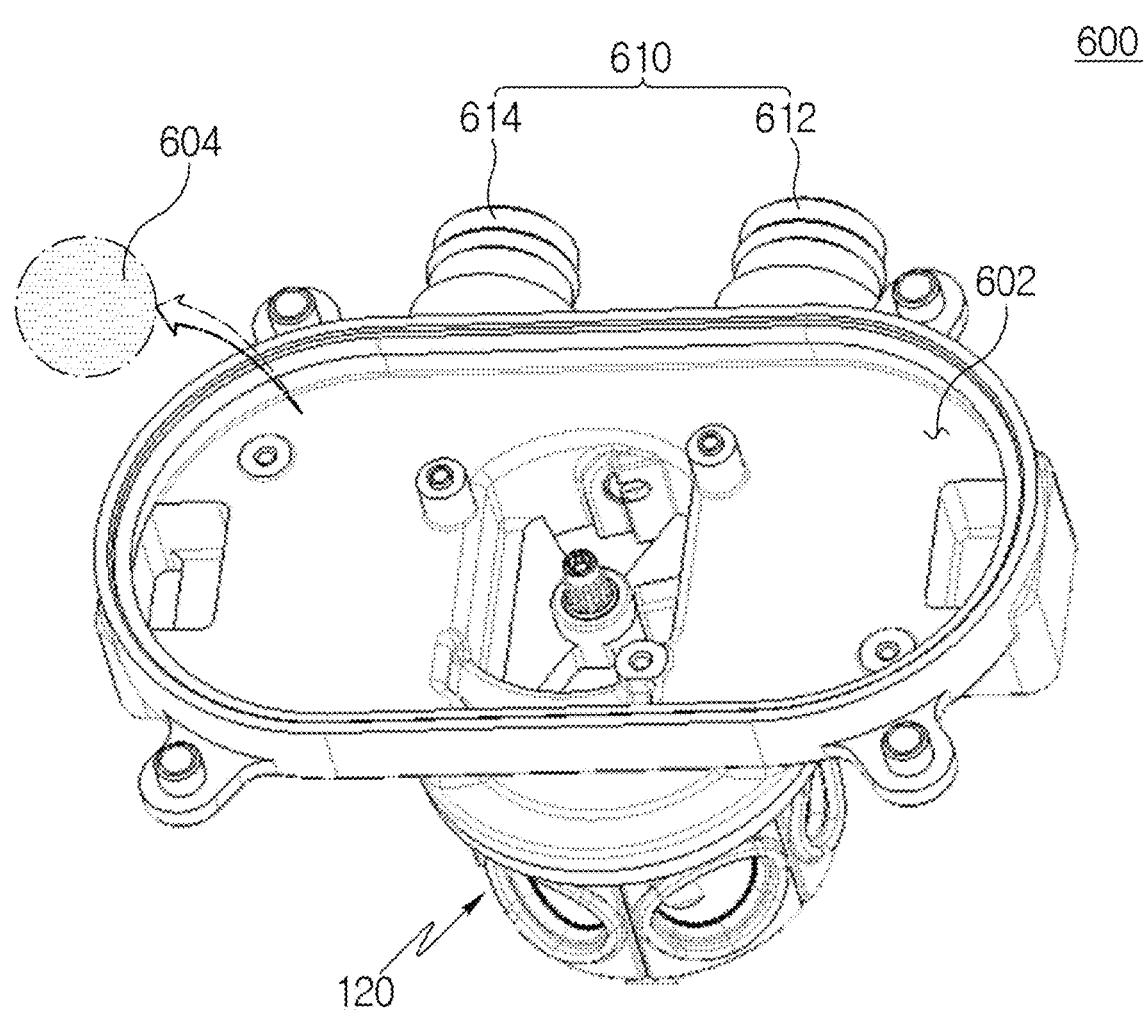
FIGS. 6 to 7 are views illustrating a controller housing according to the present embodiment.
Figure 7:
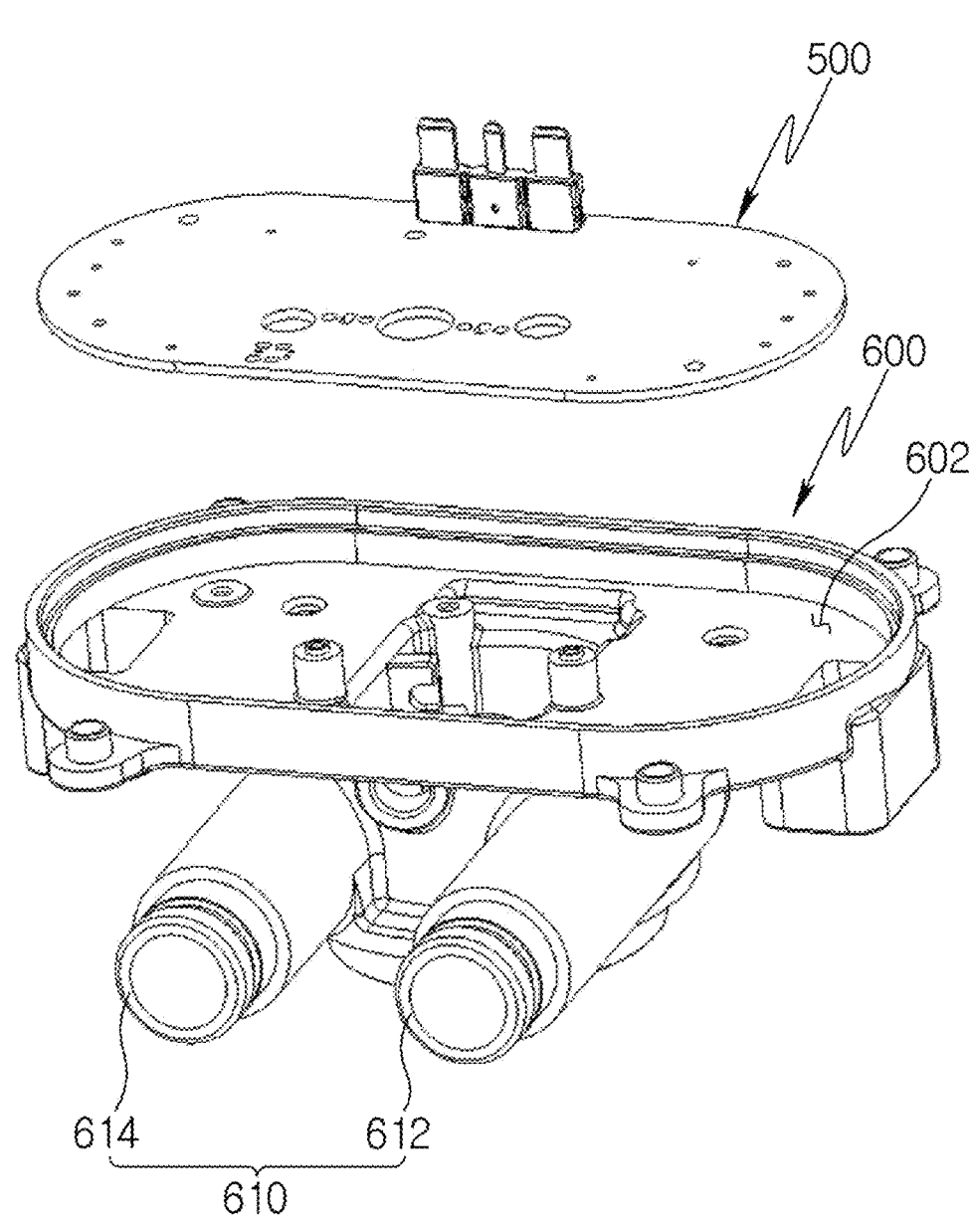
Figure 8:
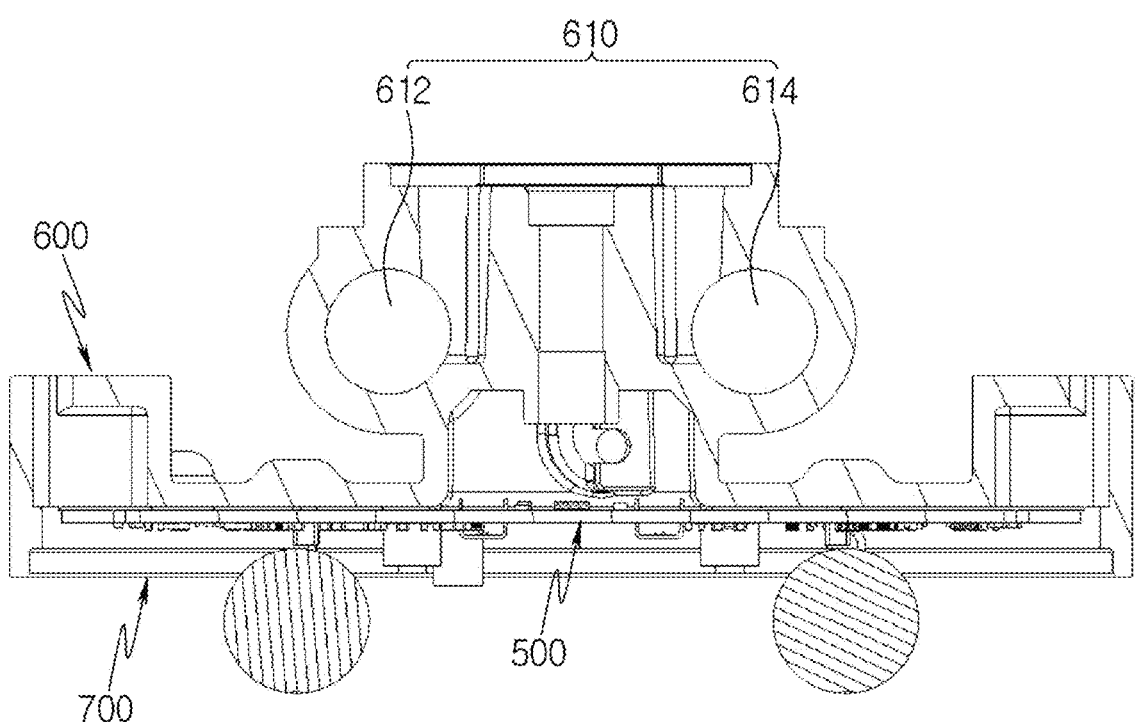
FIG. 8 is a coupled cross-sectional view of FIG. 7.
Figure 9:
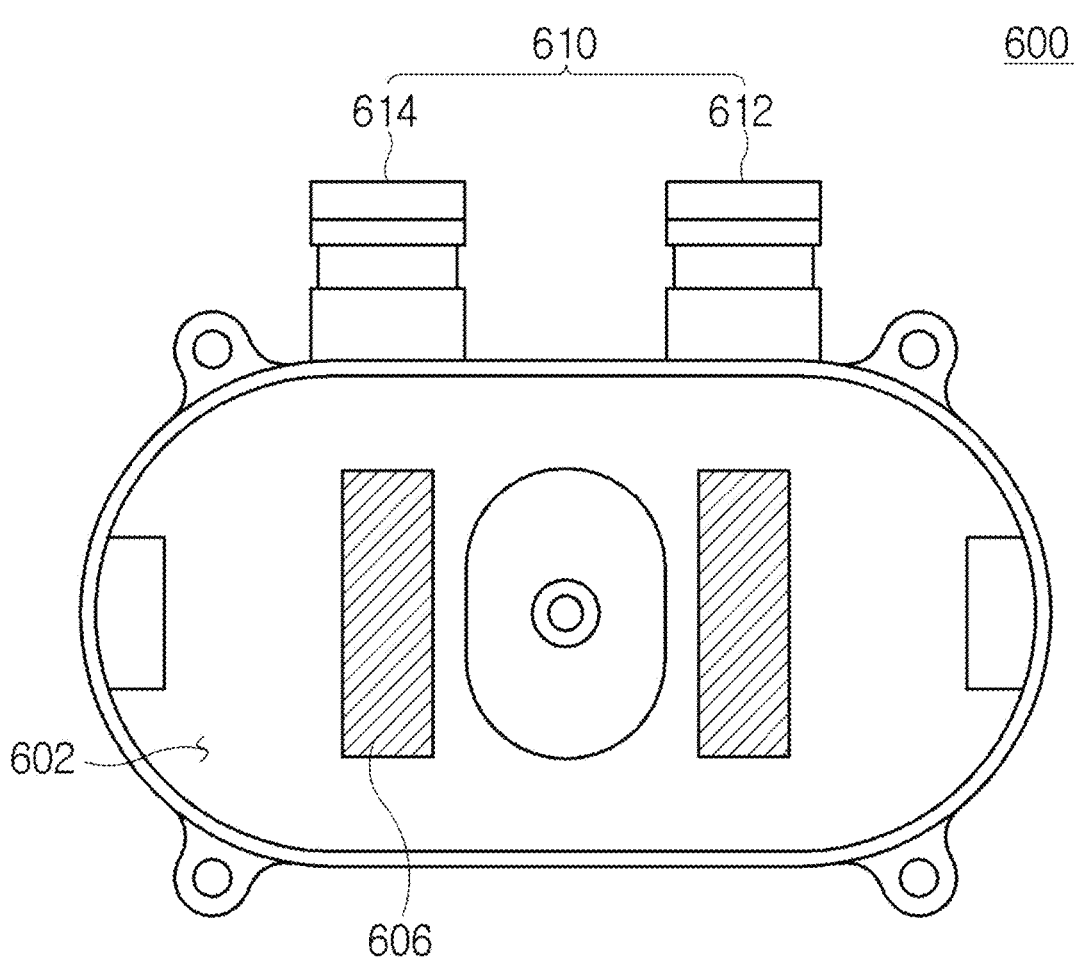
FIG. 9 is a top plan view illustrating a heat transfer induction part provided in a controller housing according to the present embodiment.

For reference, FIG. 2 is an exploded perspective view of a coolant control unit according to the present embodiment, FIGS. 3 to 4 are coupled perspective views illustrating the coolant control unit according to the present embodiment when viewed at various angles, FIG. 5 is a longitudinal cross-sectional view of FIG. 4, FIGS. 6 to 7 are views illustrating a controller housing according to the present embodiment, and FIG. 8 is a coupled cross-sectional view of FIG. 7.

With reference to FIGS. 2 to 8 attached hereto, a coolant control unit 1 according to the present embodiment includes a housing unit 100, a valve unit 200, a coolant pump unit 300, a drive motor unit 400, a control unit 500, and a controller housing 600. In addition, the coolant control unit 1 further includes a housing cover 700 configured to cover one side of the controller housing 600.

The housing unit 100 defines an overall external shape of the coolant control unit 1. The valve unit 200 is rotatably installed in the housing unit 100 and configured to change a transmission direction of the coolant.

For example, a 6-way valve is used as the valve unit 200. However, a 3-way valve or an 8-way valve may be used. A plurality of through-holes is circumferentially formed in the valve unit 600 to change a movement direction of the coolant. The valve unit 200 includes a cylinder 202 having a rotary shaft axially coupled to the drive motor unit 400 to be described below, a first seal part 204 coupled to an outer portion of the cylinder 202, a second seal part 206 provided at an upper side of the cylinder 202, and a third seal part 208 provided at a lower side of the cylinder 202.

The coolant pump unit 300 is coupled to the housing unit 100 and configured to supply the coolant to electrical components of the environmental-friendly vehicle that requires the coolant.

The drive motor unit 400 is configured to operate the valve unit 200. The control unit 500 is configured to control operations of the valve unit 200, the coolant pump unit 300, and the drive motor unit 400.

The control unit 500 is embedded in the controller housing 600. The controller housing 600 has a coolant inlet part 610 into which the coolant is introduced. The thermal energy generated by the control unit 500 exchanges heat with the coolant introduced through the coolant inlet part 610 by means of heat transfer, such that the control unit 500 is cooled.

In particular, the controller housing 600 is cooled in an air-cooled manner by outside air. The cooling process may be performed by means of heat exchange between low-temperature thermal energy transferred by the low-temperature coolant introduced through the coolant inlet part 610 and high-temperature thermal energy generated by the operation of the control unit 500. This configuration will be described below in more detail.

The housing unit 100 further includes a coolant reservoir 110 configured to store the coolant to be supplied to the housing unit 100, and a coolant outlet part 120 configured to discharge the coolant transmitted through the coolant inlet part 610 or the coolant reservoir 110.

A pump unit 300 is integrally coupled to left and right sides of the housing unit 100 based on the drawings and integrally coupled to the controller housing 600 and the cover 700 to be described below, such that the pump unit 300 may stably supply the coolant and cool the control unit 500 mounted on the controller housing 600.

The control unit 500 according to the present embodiment is a single component for performing the control process. The control unit 500 may control all the valve unit 200, the coolant pump unit 300, and the drive motor unit 400, thereby conveniently performing the integrated control.

In particular, the control unit 500 may perform the single control process without mounting separate controllers on the valve unit 200, the coolant pump unit 300, and the drive motor unit 400, thereby reducing manufacturing costs and improving control stability.

For example, the control unit 500 includes a PCB substrate on which a plurality of electronic elements is mounted. Heat is generated at a predetermined temperature when the electronic element operates. When the plurality of electronic elements simultaneously generates heat, high-temperature heat is generated. Therefore, the configuration for the cooling process needs to be essentially provided.

In the present embodiment, in order to cool the control unit 500, the controller housing 600, which receives high-temperature thermal energy generated by the control unit 500, primarily transfers heat and conducts and diffuses thermal energy generated by the electronic elements, thereby enabling the stable operation by preventing the control unit 500 from being overheated.

The control unit 500 may be the single component that may control all the operations of the valve unit 200, the coolant pump unit 300, and the drive motor unit 400 in an integrated manner, thereby improving efficiency in controlling and supplying the coolant. Further, the control unit 500 may stably supply the coolant to various types of electrical components provided in the environmental-friendly vehicle, thereby improving both fuel economy and operational stability.

In addition, in case that it is necessary to heat a battery mounted in the environmental-friendly vehicle, the coolant, which is heated by exchanging heat with the high-temperature thermal energy generated by the control unit 500, may be supplied to a battery module, thereby performing control to heat the battery module to a predetermined temperature.

The controller housing 600 and the housing unit 100 are made of different materials. For example, a material having a high heat transfer rate is used to quickly conduct the heat generated by the control unit 500. For example, the controller housing 600 is made of aluminum, but another material having a high heat transfer rate may be used.

In addition, the controller housing 600 may dissipate heat to ambient air in an air-cooled manner, such that the controller housing 600 may be cooled in an air-cooled manner by means of heat exchange between the conducted heat and air. Therefore, heat dissipation performance is improved as a temperature of air decreases.

With reference to FIG. 6 attached hereto, the controller housing 600 has a controller accommodation portion 602 configured to accommodate the control unit 500, and a heat transfer layer 604 is provided between the control unit 500 and the controller accommodation portion 602 so that the thermal energy generated by the control unit 500 is transferred to the controller accommodation portion 602.

For example, thermally conductive paste may be used for the heat transfer layer 604. The heat transfer layer 604 may be applied with a predetermined thickness inside the controller accommodation portion 602, such that the heat transfer layer 604 is kept in a state of being in close contact with the control unit 500.

For example, the heat transfer layer 604 may be configured in the form of a sheet. In this case, a single thin-film heat transfer sheet or a plurality of thin-film heat transfer sheets is stacked and kept in the state of being in close contact with the control unit 500. For reference, a position at which the heat transfer layer 604 is in close contact with the control unit 500 is in close contact with a bottom surface opposite to a top surface on which the electronic elements are mounted.

With reference to FIGS. 7 to 11 attached hereto, the controller accommodation portion 602 is provided in the form of a groove having a predetermined depth, and the control unit 500 is assembled in a state of being inserted into the controller accommodation portion 602.

In the present embodiment, in order to quickly conduct heat and stably dissipate heat from the control unit 500, a heat transfer induction part 606 is provided to provide directionality when the thermal energy generated by the control unit 500 is transferred along an extension route of the coolant inlet part 610.

That is, the heat transfer induction part 606 is disposed at a position facing the coolant inlet part 610, the high-temperature thermal energy is concentrated on the heat transfer induction part 606 being in close contact with the control unit 500 and transferred along the extension route of the heat transfer induction part 606.

Further, the low-temperature coolant introduced into the coolant inlet part 610 performs heat transfer with the thermal energy concentrated on the heat transfer induction part 606, thereby quickly cooling the control unit 500. For reference, even in the remaining region excluding the heat transfer induction part 606, the heat transfer is implemented by the contact, and a larger amount of heat is concentrated on and transferred to the heat transfer induction part 606.

The heat transfer induction part 606 is formed in a thin plate shape and extends by a predetermined length in a direction in which the coolant inlet part 610 is introduced. The heat transfer induction part 606 preferentially receives the thermal energy generated by the control unit 500 and allows the thermal energy to exchange heat with the low-temperature coolant flowing through the coolant inlet part 610, thereby enabling a quick cooling process, preventing a malfunction of the plurality of electronic elements that generates high-temperature heat, and enabling the control unit 500 to stably operate.

The heat transfer induction part 606 may be variously changed to other shapes other than the shapes illustrated in the drawings. The present disclosure is not limited to the shapes illustrated in the drawings.

In addition, the heat transfer induction part 606 is not limited to the arrangement state illustrated in the drawings, and the heat transfer induction part 606 may branch off from an edge of the controller accommodation portion 602 once more and extend to prevent the electronic element, which generates heat, from being overheated.

Figure 10:
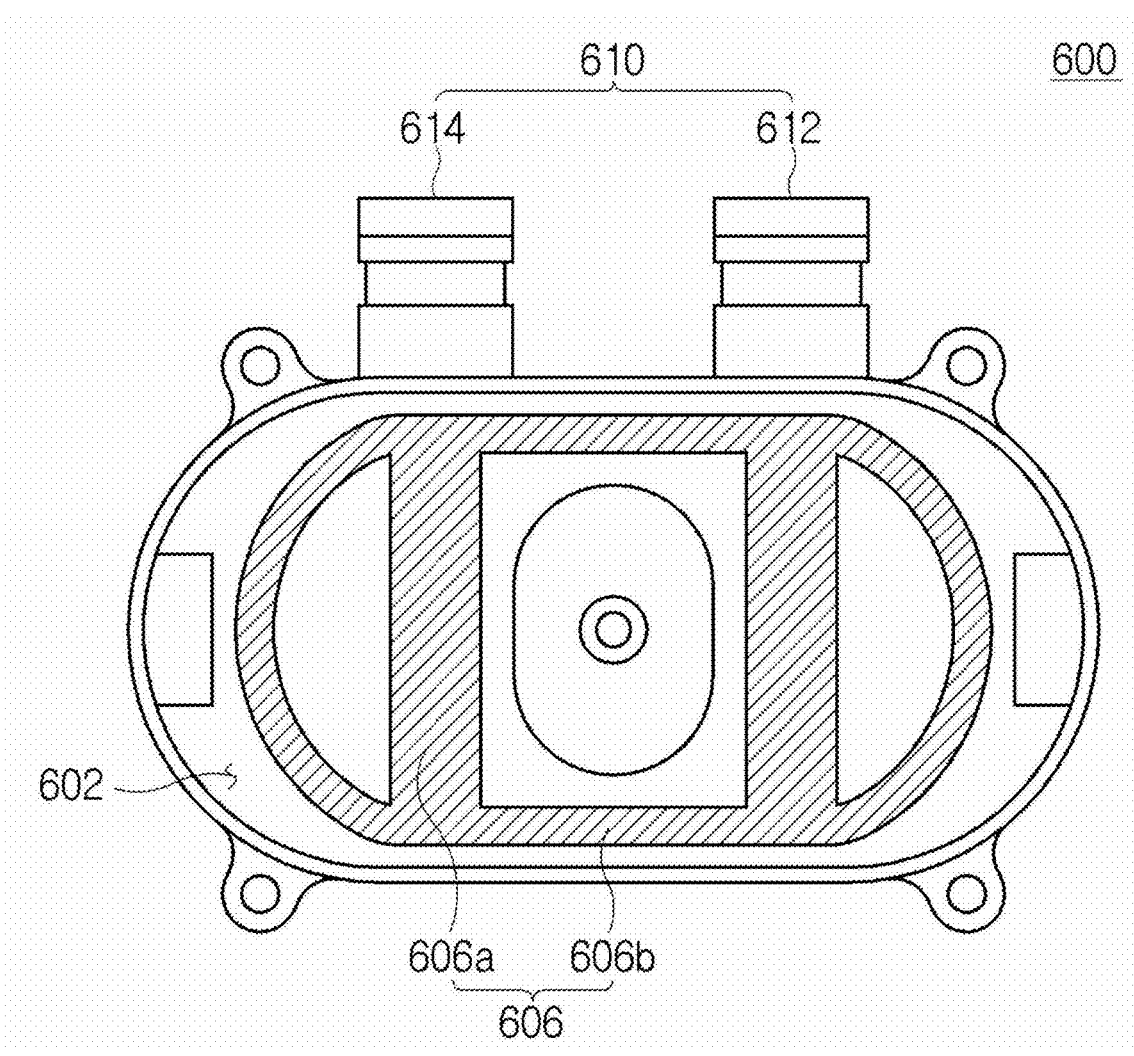
FIG. 10 is a view illustrating a modified embodiment of the heat transfer induction part according to the present embodiment.

With reference to FIG. 10 attached hereto, the heat transfer induction part 606 according to the present embodiment includes a first heat transfer induction portion 606a formed to have a predetermined length and provided on an inner bottom surface of the controller accommodation portion 602, and a second heat transfer induction portion 606b extending from an extension end of the first heat transfer induction portion 606a along an inner edge of the controller accommodation portion 602.

The first heat transfer induction portion 606a may be formed at a position most adjacent to the coolant inlet part 610. However, the position of the first heat transfer induction portion 606a may be changed to a position illustrated in the drawings or another position depending on a layout of the controller accommodation portion 602.

The second heat transfer induction portion 606b may perform stable thermal conduction by minimizing an environment in which the thermal energy transferred through the first heat transfer induction portion 606a is guided along the inner edge of the controller accommodation portion 602 and then diffused without being concentrated on the position at which the plurality of electronic elements is disposed such that the thermal energy is concentrated on the position at which the plurality of electronic elements is concentrated without being transferred, which may raise a temperature to a high temperature.

The second heat transfer induction portion 606b extends along the inner edge of the controller accommodation portion 602. However, the second heat transfer induction portion 606b may extend to positions, except for the positions illustrated in the drawings, depending on the layout.

The heat transfer induction part 606 is formed in any one of an embossed shape and a debossed shape in the controller accommodation portion 602. The shape of the heat transfer induction part 606 may be variously changed without being limited to a particular shape.

Figure 11:
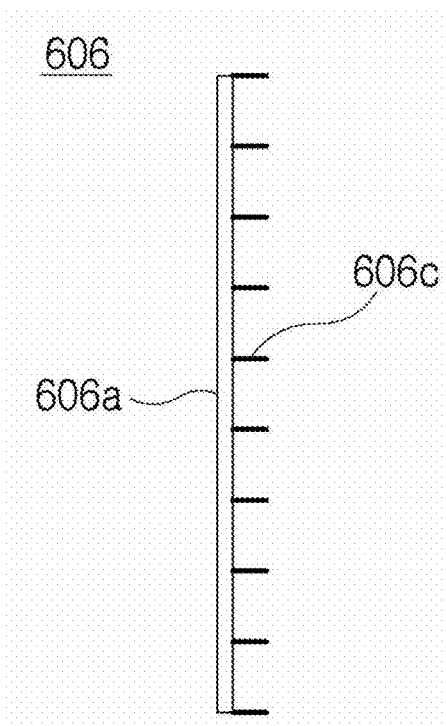
FIG. 11 is a view illustrating another embodiment of the heat transfer induction part according to the present embodiment.

With reference to FIG. 11 attached hereto, the heat transfer induction part 606 according to the present embodiment has the same configuration as the first heat transfer induction portion 606a extending by a predetermined length on the inner bottom surface of the controller accommodation portion 602 and includes a third heat transfer induction portion 606c extending by a predetermined length from the first heat transfer induction portion 606a toward the inside of the controller accommodation portion 602.

For example, the third heat transfer induction portion 606c may be formed in a plate shape having a predetermined thickness and coupled in a state of being inserted into the controller housing 600 made of aluminum. The third heat transfer induction portion 606c may conduct the heat transferred from the first heat transfer induction portion 606a to one side surface of the controller housing 600 and further facilitate the heat exchange with the low-temperature coolant flowing along the coolant inlet part 610, thereby cooling the control unit 500.

In this case, the thermal energy generated by the control unit 500 may be thermally conducted through the heat transfer induction part 606, thermally conducted through the controller housing 600, and dissipated in an air-cooled manner at the outside of the controller housing 600, thereby enabling quick heat dissipation from the control unit 500.

The coolant pump unit 300 includes a first coolant pump 310 configured to supply the coolant to an electric power system unit provided in the environmental-friendly vehicle, and a second coolant pump 320 configured to supply the coolant to a battery unit provided in the environmental-friendly vehicle or an electrical component related to a battery.

For example, the first coolant pump 310 is configured to supply the coolant to an electric power system electrical component provided in the environmental-friendly vehicle. For example, the first coolant pump operates to pressurize and supply the coolant at a predetermined flow velocity toward a motor control controller provided in the environmental-friendly vehicle, thereby cooling the motor control controller.

For reference, the electrical component to which the coolant is supplied by the first coolant pump 310 has been described as being limited to the motor control controller, but the coolant may be supplied to other electric power system electrical components.

The second coolant pump 320 is configured to pressurize, at a predetermined flow velocity, the coolant required to cool a battery electrical component provided in the environmental-friendly vehicle in order to cool the battery electrical component.

The first coolant pump 310 and the second coolant pump 320 each include a motor housing (not illustrated), a stator (not illustrated), a rotor (not illustrated), an impeller housing (not illustrated), and an impeller (not illustrated).

The first coolant pump 310 is coupled to the left side and the second coolant pump 320 is coupled to the right side when the housing unit 100 is viewed from the front side.

The coolant outlet part 120 includes a first coolant outlet portion 122 connected to the first coolant pump 310, and a second coolant outlet portion 124 connected to the second coolant pump 320.

The first coolant outlet portion 122 is configured to supply the coolant to the electric power system unit, and the second coolant outlet portion 124 is configured to supply the coolant to the battery unit or the electrical component related to the battery unit.

Connection members, such as hoses, may be coupled to the first and second coolant outlet portions 122 and 124 by means of clamps so that the coolant flows.

The coolant reservoir 110 according to the present embodiment may extend by a predetermined depth, and an internal space of the coolant reservoir 110 may be divided by a partition wall 113, such that the coolants having different temperatures may be stored and flow without being mixed with one another.

For example, the coolant reservoir 110 and the housing unit 100 are integrated without being independently provided as separate components, thereby simplifying the components, improving the ease of assembling, and reducing manufacturing costs.

The coolant reservoir 110 includes a first coolant reservoir 112 extending by a predetermined diameter and length and configured to supply the coolant to the first coolant pump 310, and a second coolant reservoir 114 configured to supply the coolant to the second coolant pump 320.

The state in which the predetermined coolants are introduced may be maintained in the first and second coolant reservoirs 112 and 114, thereby implementing the stable operation of the pump unit 300.

The coolant inlet part 610 includes a first coolant inlet portion 612 configured to simultaneously supply the low-temperature coolant to the first coolant pump 310 and transfer the thermal energy generated by the control unit 500, and a second coolant inlet portion 614 configured to simultaneously supply the low-temperature coolant to the second coolant pump 320 and transfer the thermal energy generated by the control unit 500.

The first and second coolant inlet portions 612 and 614 are made of aluminum material, such that when the low-temperature coolant is introduced, the low-temperature thermal energy is conducted to the entire controller housing 600 and exchanges heat with the high-temperature thermal energy transferred from the control unit 500.

The present embodiment further includes the housing cover 700 coupled to the controller housing 600 and configured to accommodate the drive motor unit 400, and the housing cover 700 is coupled to seal one side of the control unit 500 accommodated in the controller housing 600.

The housing unit 100 further includes the coolant outlet part 120 configured to discharge the coolant transmitted through the coolant inlet part 610 or the coolant reservoir 110. The first coolant outlet portion 122 is configured to discharge the coolant supplied to the first coolant pump 310, and the second coolant outlet portion 124 is configured to discharge the coolant supplied to the second coolant pump 320.

Figure 12:
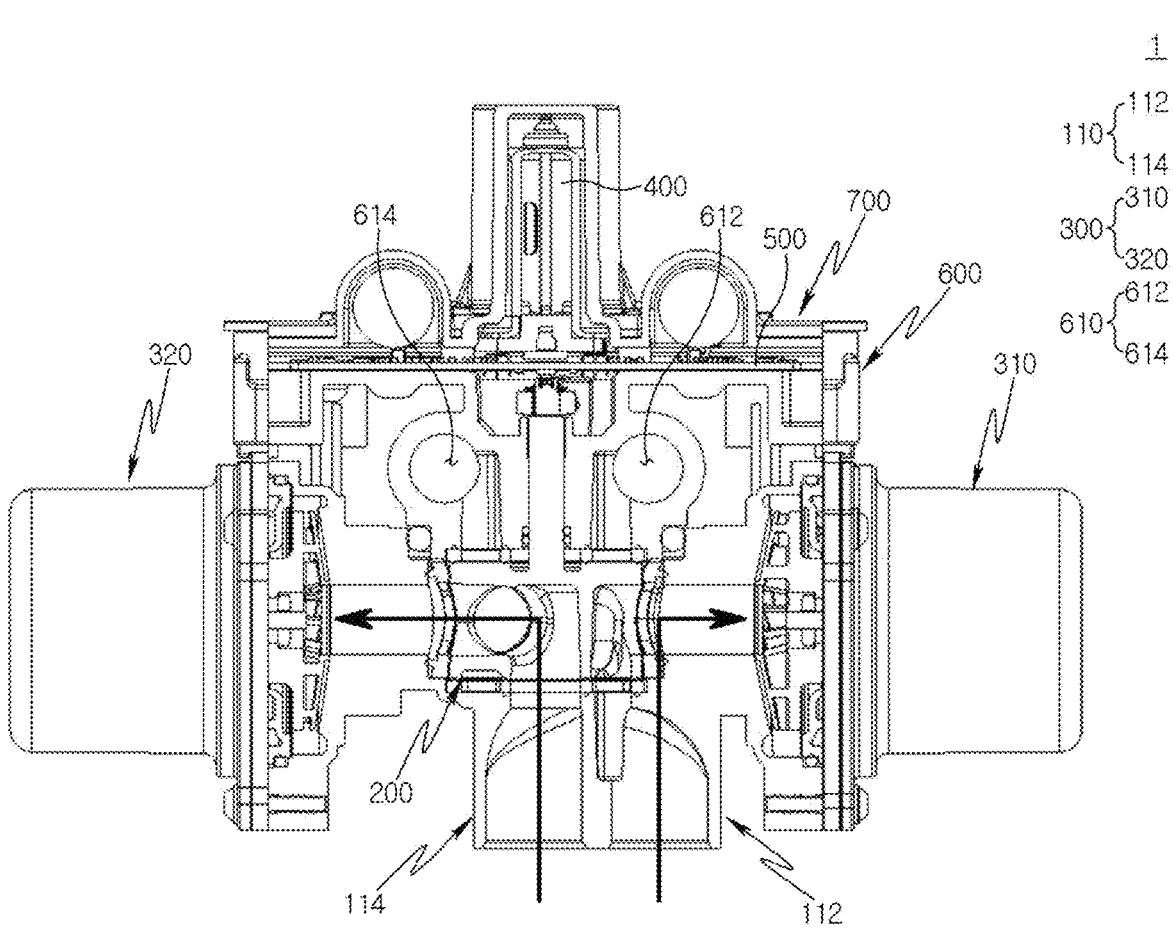
FIGS. 12 to 15 are views illustrating an operating state of the coolant control unit according to the present embodiment.

With reference to FIG. 12 attached hereto, the present embodiment may be operated in a first mode M1 by the coolant control unit to supply the heated coolant to the electric power system unit and the battery unit.

In the first mode M1, after the coolants are introduced through the first and second coolant reservoirs 112 and 114, the coolants are pumped by the first and second coolant pumps 310 and 320, and the coolants are supplied to the electric power system unit and the battery unit through the first and second coolant outlet portions 122 and 124 (see FIG. 3), such that the heating process may be performed. For reference, the control unit 500 controls the drive motor unit 400 to rotate the valve unit 200 to a position corresponding to the first mode M1.

Figure 13:
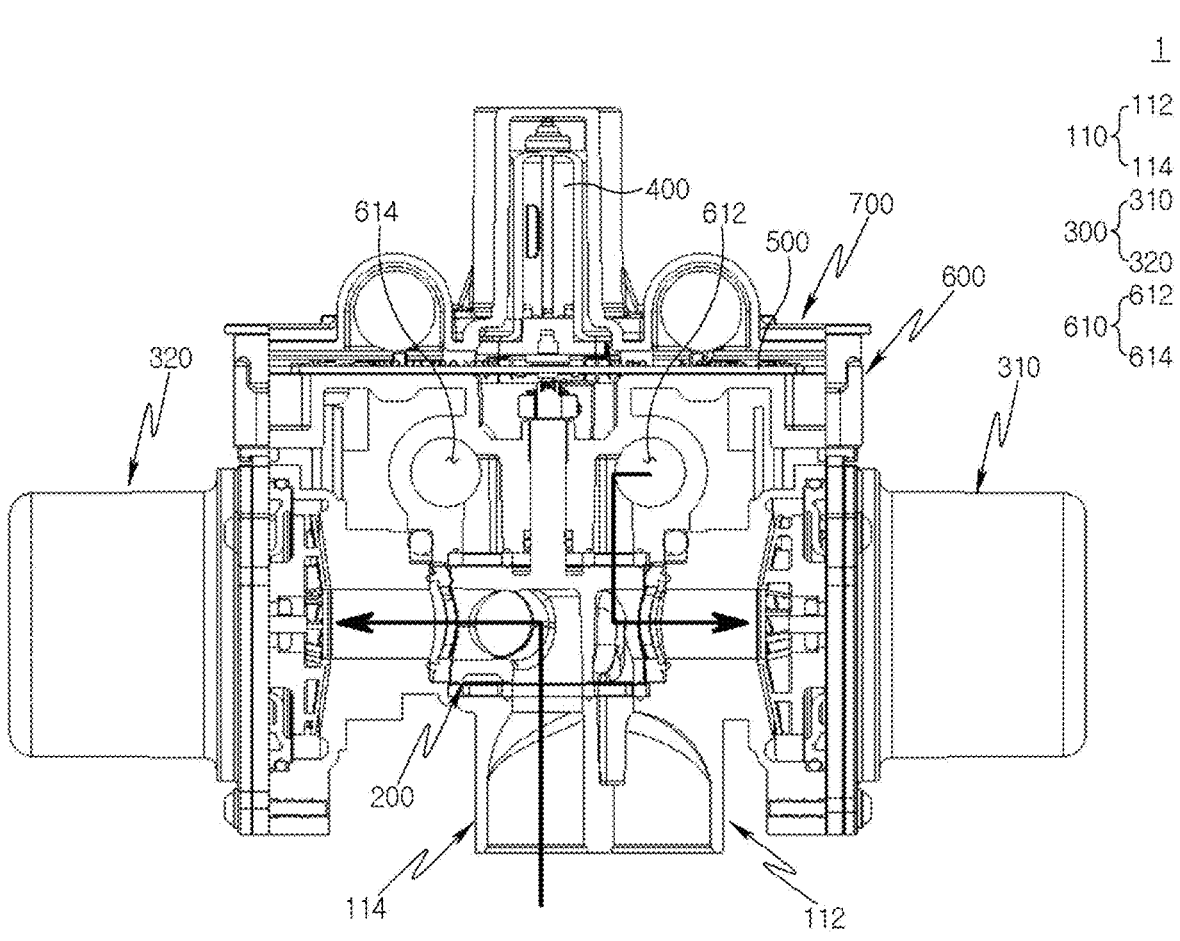

With reference to FIG. 13 attached hereto, the present embodiment may be operated in a second mode M2 by the coolant control unit to supply the heated coolant to the electric power system unit and supply the low-temperature coolant to the battery unit.

In the second mode M2, the coolant introduced through the first coolant inlet portion 612 is pumped by the first coolant pump 310 and discharged to the first coolant outlet portion 122.

Further, the coolant introduced through the second coolant inlet portion 614 may be pumped by the second coolant pump 320, discharged to the second coolant outlet portion 124, and then supplied to the battery unit, thereby cooling the battery unit.

Figure 14:
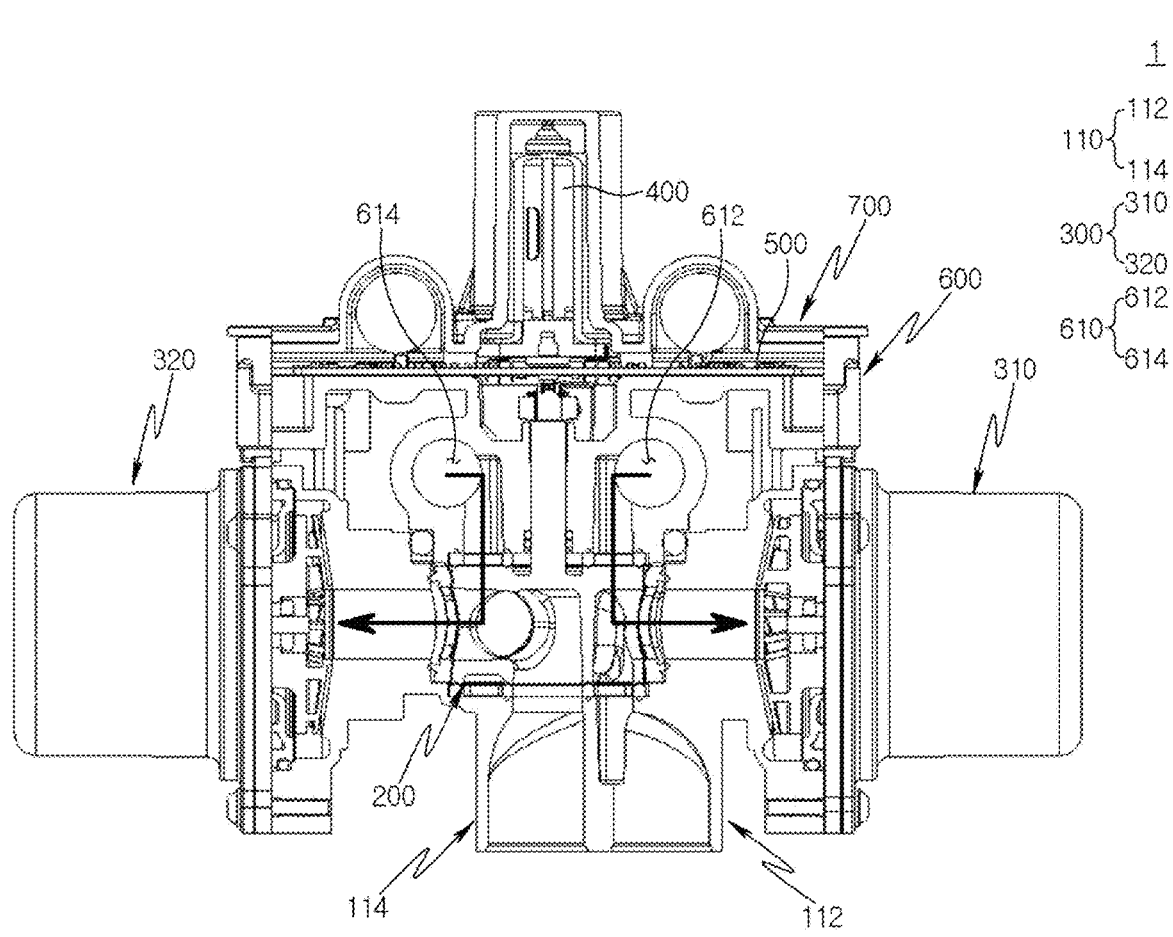

With reference to FIG. 14 attached hereto, the present embodiment may be operated in a third mode M3 by the coolant control unit to supply the cooled coolant to the electric power system unit and supply the low-temperature coolant to the battery unit.

Figure 15:
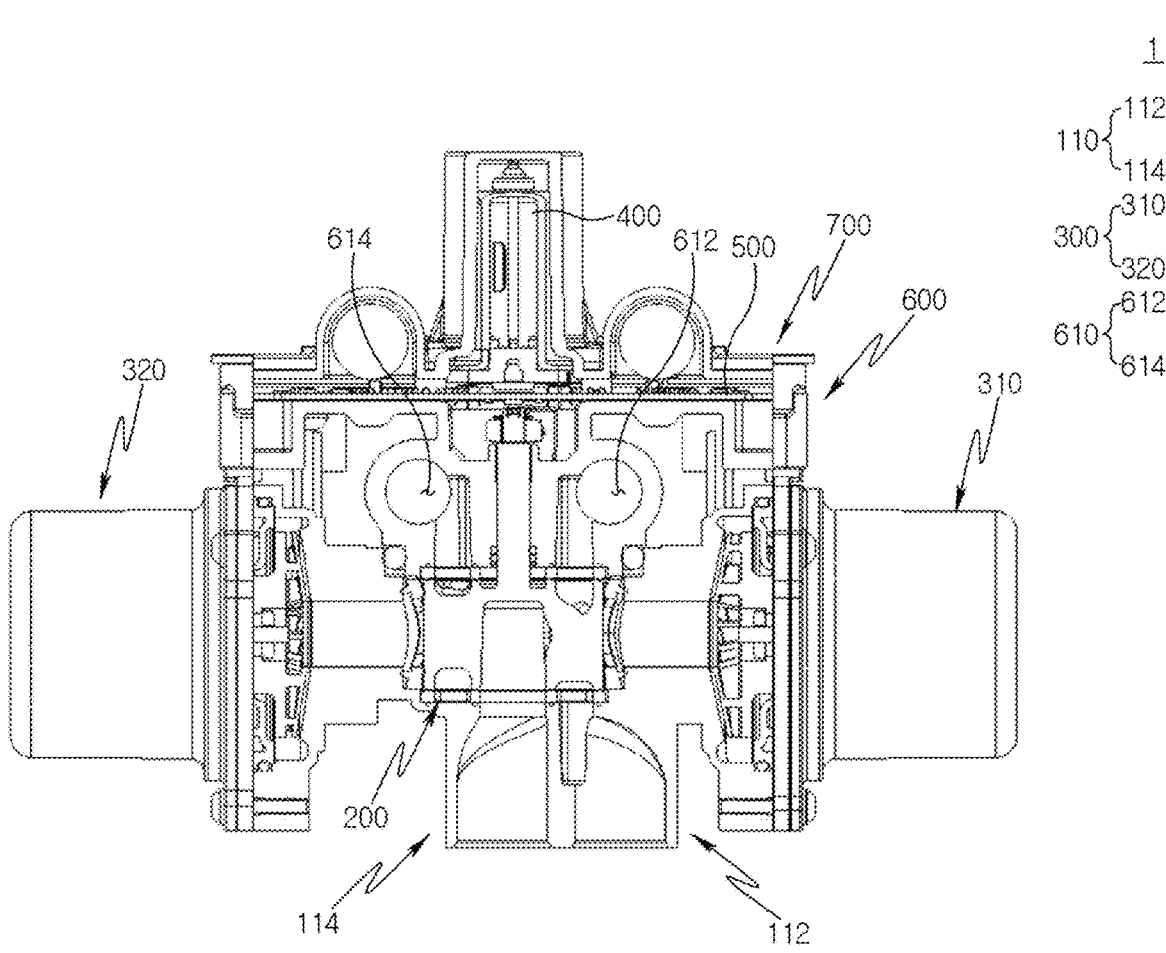

With reference to FIG. 15 attached hereto, the present embodiment illustrates a state of a fourth mode M4 in which before an initial operation of the coolant control unit, the air remaining in the housing unit 100 is discharged, and an operation is performed to introduce the coolant.

While the exemplary embodiments of the present disclosure have been described above, those skilled in the art may variously modify and change the present disclosure by adding, changing, deleting or modifying constituent elements without departing from the spirit of the present disclosure disclosed in the claims, and the modification and change also belong to the scope of the present disclosure.

The present embodiments may be used for the coolant control unit capable of stably supplying the coolant to various electrical components provided in the environmental-friendly vehicle and performing the cooling process.

The invention claimed is:

1. A coolant control unit comprising:
   a housing unit configured to define an overall external shape;
   a valve unit rotatably installed in the housing unit and configured to change a transmission direction of a coolant;
   a coolant pump unit coupled to the housing unit;
   a drive motor unit configured to operate the valve unit;
   a control unit configured to control operations of the valve unit, the coolant pump unit, and the drive motor unit; and
   a controller housing configured to accommodate the control unit and having a coolant inlet part through which the coolant is introduced, the controller housing configured such that the control unit is cooled as thermal energy generated by the control unit exchanges heat, by means of heat transfer, with the coolant introduced through the coolant inlet part.

2. The coolant control unit of claim 1, wherein the housing unit further comprises:
   a coolant reservoir configured to store the coolant to be supplied to the housing unit; and
   a coolant outlet part configured to discharge the coolant transmitted through the coolant inlet part or the coolant reservoir.

3. The coolant control unit of claim 1, wherein the controller housing and the housing unit are made of different materials.

4. The coolant control unit of claim 1, wherein the controller housing is made of a material having a high heat transfer rate.

5. The coolant control unit of claim 1, wherein the controller housing has a controller accommodation portion configured to accommodate the control unit, and a heat transfer layer is provided between the control unit and the controller accommodation portion so that the thermal energy generated by the control unit is transferred to the controller accommodation portion.

6. The coolant control unit of claim 5, further comprising:
   a heat transfer induction part provided on the controller accommodation portion and configured to provide directionality when the thermal energy generated by the control unit is transferred along an extension route of the coolant inlet part.

7. The coolant control unit of claim 6, wherein the heat transfer induction part is formed in a thin plate shape and extends by a predetermined length in a direction in which the coolant inlet part is introduced.

8. The coolant control unit of claim 6, wherein the heat transfer induction part further comprises:
   a first heat transfer induction portion formed to have a predetermined length and provided on an inner bottom surface of the controller accommodation portion; and
   a second heat transfer induction portion extending from an extension end of the first heat transfer induction portion along an inner edge of the controller accommodation portion.

9. The coolant control unit of claim 6, wherein the heat transfer induction part is formed in any one of an embossed shape and a debossed shape in the controller accommodation portion.

10. The coolant control unit of claim 1, wherein the coolant pump unit further comprises:
   a first coolant pump configured to supply the coolant to an electric power system unit provided in an environmental-friendly vehicle; and
   a second coolant pump configured to supply the coolant to a battery unit provided in the environmental-friendly vehicle or an electrical component related to a battery.

11. The coolant control unit of claim 10, wherein the coolant inlet part further comprises:
   a first coolant inlet portion configured to simultaneously supply a low-temperature coolant to the first coolant pump and transfer the thermal energy generated by the control unit; and
   a second coolant inlet portion configured to simultaneously supply a low-temperature coolant to the second coolant pump and transfer the thermal energy generated by the control unit.

12. The coolant control unit of claim 2, wherein a partition wall is provided in the coolant reservoir to independently divide an internal space of the coolant reservoir and store the coolant.

13. The coolant control unit of claim 1, further comprising a housing cover coupled to the controller housing and configured to accommodate the drive motor unit therein.

* * * * *